(12) United States Patent
Catania (10) Patent No.: US 9,339,147 B2
(45) Date of Patent: *May 17, 2016

(54) CONFIGURABLE DEVICE TO BREAK DRIED PASTA

(71) Applicant: George J. Catania, Babylon, NY (US)

(72) Inventor: George J. Catania, Babylon, NY (US)

(*) Notice: Subject to any disclaimer, the term of this patent is extended or adjusted under 35 U.S.C. 154(b) by 57 days.

This patent is subject to a terminal disclaimer.

(21) Appl. No.: 14/710,094

(22) Filed: May 12, 2015

(65) Prior Publication Data

US 2015/0237873 A1    Aug. 27, 2015

Related U.S. Application Data

(63) Continuation of application No. 13/836,420, filed on Mar. 15, 2013, now Pat. No. 9,066,625.

(51) Int. Cl.
| | | |
|---|---|---|
| *B26F 3/00* | (2006.01) | |
| *B26D 5/00* | (2006.01) | |
| *A47J 43/00* | (2006.01) | |
| *A47J 43/28* | (2006.01) | |
| *A47J 42/00* | (2006.01) | |
| *A21C 11/22* | (2006.01) | |

(52) U.S. Cl.
CPC ............. *A47J 43/00* (2013.01); *A21C 11/22* (2013.01); *A47J 42/00* (2013.01); *A47J 43/28* (2013.01); *B26F 3/00* (2013.01); *Y10T 225/371* (2015.04)

(58) Field of Classification Search
CPC .......... A47J 43/00; A47J 43/04; A47J 42/02; A47J 42/04; B26F 3/00; B26F 3/002; B26D 5/00; B26D 7/00; B26D 3/16; Y10Y 225/30; Y10Y 225/364; Y10Y 225/371; Y10Y 225/379; Y10T 83/932; Y10T 83/8791; Y10T 83/494; Y10T 83/501; Y10T 83/496; A21C 11/22
USPC ............ 241/91, 92, 169.1, 277, 278.1, 278.2, 241/279, 282.1, 282.2
See application file for complete search history.

(56) References Cited

U.S. PATENT DOCUMENTS

| | | |
|---|---|---|
| 3,303 A | 10/1843 | Evarts |
| 1,310,343 A | 7/1919 | Iltis |
| 2,093,211 A | 9/1937 | Rettinger |
| 2,252,363 A | 8/1941 | Carus |
| 3,061,440 A | 10/1962 | Johannes |
| 3,473,714 A | 10/1969 | Woody |
| 4,331,300 A | 5/1982 | Hicks et al. |
| 4,393,737 A | 7/1983 | Shibata |
| 5,417,152 A | 5/1995 | Harrison |
| 6,187,358 B1 | 2/2001 | Inoue et al. |
| 6,199,467 B1 | 3/2001 | Defrancisci et al. |

(Continued)

*Primary Examiner* — Phong Nguyen
(74) *Attorney, Agent, or Firm* — Hoffmann & Baron, LLP (57) ABSTRACT

A configurable device includes a body, driveshaft, plate and driver. The body includes a receptacle, recess, and axial bore. The receptacle is disposed about the bore, and the recess is disposed below and in communication with the receptacle. The receptacle is to receive a pasta strand and communicate a portion of the strand into the recess. The driveshaft includes a first portion and second portion. The first portion extends through the bore, and the second portion extends into the recess. The plate is secured to the second portion and includes a surface having a radial projection extending toward the recess. The planar surface is to abut the portion of the strand in the recess. The driver has an axial opening to removeably engage the first portion. The driver is enabled to rotate the driveshaft that in turn rotates the plate causing the projection to break the portion of the strand.

19 Claims, 4 Drawing Sheets

(56) References Cited

U.S. PATENT DOCUMENTS

| | | |
|---|---|---|
| 6,409,109 B1 | 6/2002 | Wu |
| 6,510,784 B1 | 1/2003 | Fevre et al. |
| 8,250,959 B2 | 8/2012 | Beber et al. |
| 2006/0087916 A1 | 4/2006 | Yang et al. |
| 2007/0245903 A1 | 10/2007 | Eden |
| 2008/0163768 A1 | 7/2008 | Glucksman et al. |
| 2008/0250943 A1 | 10/2008 | Malandain et al. |
| 2010/0206971 A1 | 8/2010 | Thornton |

CONFIGURABLE DEVICE TO BREAK DRIED PASTA

CROSS REFERENCE TO RELATED APPLICATION

This application is a continuation of U.S. patent application Ser. No. 13/836,420 filed on Mar. 15, 2013, which is incorporated herein by reference in its entirety.

BACKGROUND

1. Field

The present disclosure relates to devices that form pasta. More specifically, the present disclosure is directed to a configurable device to break strands of dried pasta into pieces of approximately similar length, and a method of breaking strands of dried pasta into pieces of approximately similar length.

2. Brief Discussion of Related Art

Pasta is a food made from dough of flour, water, and sometimes eggs. The dough can be formed into a variety of shapes, dried and packaged. The packaged pasta is sold through a variety of locations, such as supermarkets. Various prepared dishes include pasta that is boiled and then served as a main ingredient with a variety of meat, tomato, or other sauces. Several of the shapes of dried pasta that are used frequently include long dried strands that are round or flat (e.g., spaghetti, linguini, etc.).

The strands of dried pasta are generally uniform in length depending on the packaging or container. Sometimes, it is desirable to break these strands of pasta into smaller pieces of approximately similar length because of the food to be prepared, the size of the pot in which the food is to be prepared (e.g., pot in which pasta is boiled), and/or easier consumption of the prepared food (e.g., by seniors and/or children). While long strands of pasta are generally consumed using a fork, which requires dexterity to operate the fork and the ability to chew, smaller pieces of pasta can be consumed using a spoon, which generally requires less dexterity and less ability to chew.

It is difficult to break the one or more strands of dried pasta by hand without creating multiple fragments of various lengths and even more difficult to break the strands of dried pasta into multiple pieces of approximately similar length.

One usually holds one or more strands of pasta by their ends and bends the strands until they break. As a strand of dried pasta is bent at its ends until it can curve no longer, it will tend to break into multiple fragments of various lengths. Specifically, the sudden break in the strand causes a burst of flexural waves to travel through the broken fragments, which can cause some of these fragments to further curve and break. The broken fragments can have various lengths.

It is therefore desirable to provide a configurable device that can break strands of dried pasta into pieces of approximately similar length, improving the uniformity of the resulting pieces and mitigating fragments of dissimilar lengths.

SUMMARY

A configurable device to break at least one dried pasta strand is disclosed.

The device includes a body, a driveshaft, a plate and a driver. The body includes at least one receptacle, a recess, and an axial bore. The at least one receptacle is disposed about the axial bore. The recess is disposed below and in communication with the at least one receptacle. The at least one receptacle is configured to receive the at least one dried pasta strand and configured to communicate a portion of the at least one dried pasta strand into the recess.

The driveshaft includes a first portion and a second portion. The first portion extends at least through an axial bore, and the second portion extends into the recess.

The plate is secured to the second portion of the driveshaft in relation to the recess. The plate includes a planar surface having at least one radial projection extending toward the recess. The planar surface is configured to abut the portion of the at least one dried pasta strand in the recess. In various embodiments, a distance between the planar surface of the plate and the recess (e.g., height of the recess) is adjustable.

The driver has an axial opening to removeably engage the first portion of the driveshaft in relation to the at least one receptacle. The driver is enabled to rotate the driveshaft that in turn rotates the plate causing the projection to break the portion of the at least one dried pasta strand. In some aspects or embodiments, the driver can include an outer wall an axial hub that includes the axial opening, where the outer wall and the hub define a recess in the driver.

The at least one receptacle can include at least one opening that provides communication of the at least one receptacle with the recess. Moreover, the body can include a plurality of receptacles disposed about the axial bore.

In some aspects or embodiments, the body can define an outer wall, a plurality of radial walls, and an axial hub that includes the axial bore. In these aspects or embodiments, the plurality of radial walls can extend from the hub to the outer wall, where each pair of the plurality of radial walls defines a receptacle about the axial hub. Moreover, at least one wall of the plurality of walls can include a chamfer extending radially along a top portion of the at least one wall.

In other aspects or embodiments, the body can include an outer wall and a concave surface. The concave surface can extend from the axial bore in the body to the outer wall. The receptacles can be openings that are disposed about the axial bore. The openings can be coaxial with the axial bore. In some aspects or embodiments, the openings can be disposed in at least one ring spaced away from the axial bore.

The configurable device can include a removable connector that is extendable into the driver to secure the driver in relation to the driveshaft. The removable connector includes a top and an axial pin. In some aspects or embodiments, the axial pin of the removable connector is extendable into the axial opening of the driver and an axial opening included in the first portion of the driveshaft, such that the driver is secured in relation to the first portion of the driveshaft.

In some aspects or embodiments, the first portion of the driveshaft can include an axial opening and a plurality of slots. The plurality of slots can extend radially from the axial opening through to an exterior surface of the first portion, such that pairs of the plurality of slots define a plurality of reeds about the axial opening. In these aspects or embodiments, the axial pin of the removable connector is extendable into the axial opening of the driver and the axial opening of the first portion of the driveshaft, such that the driver is secured in relation to the plurality of reeds of the first portion of the driveshaft.

In some aspects or embodiments, the body and the driver can combine to form a shape of a bottle, e.g., a wine bottle. The body can have a shape of a bottom portion of the bottle, while the driver can have a shape of a top portion of the bottle. The driver can include an outer wall, an arcuate portion, and a neck, where the arcuate portion connects the outer wall to the neck. In other aspects or embodiments, the body and the driver can combine to form a generally tubular shape (e.g., similar to a pepper grinder device). In various other aspects or embodiments, the body and the driver can each have regular or irregular shapes and can combine to form one or more different shapes.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which.

DETAILED DESCRIPTION

A configurable device to break strands of dried pasta into pieces of similar length and a method of manufacturing the configurable device are disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

Figures 1, 2, 3, 4, 5:
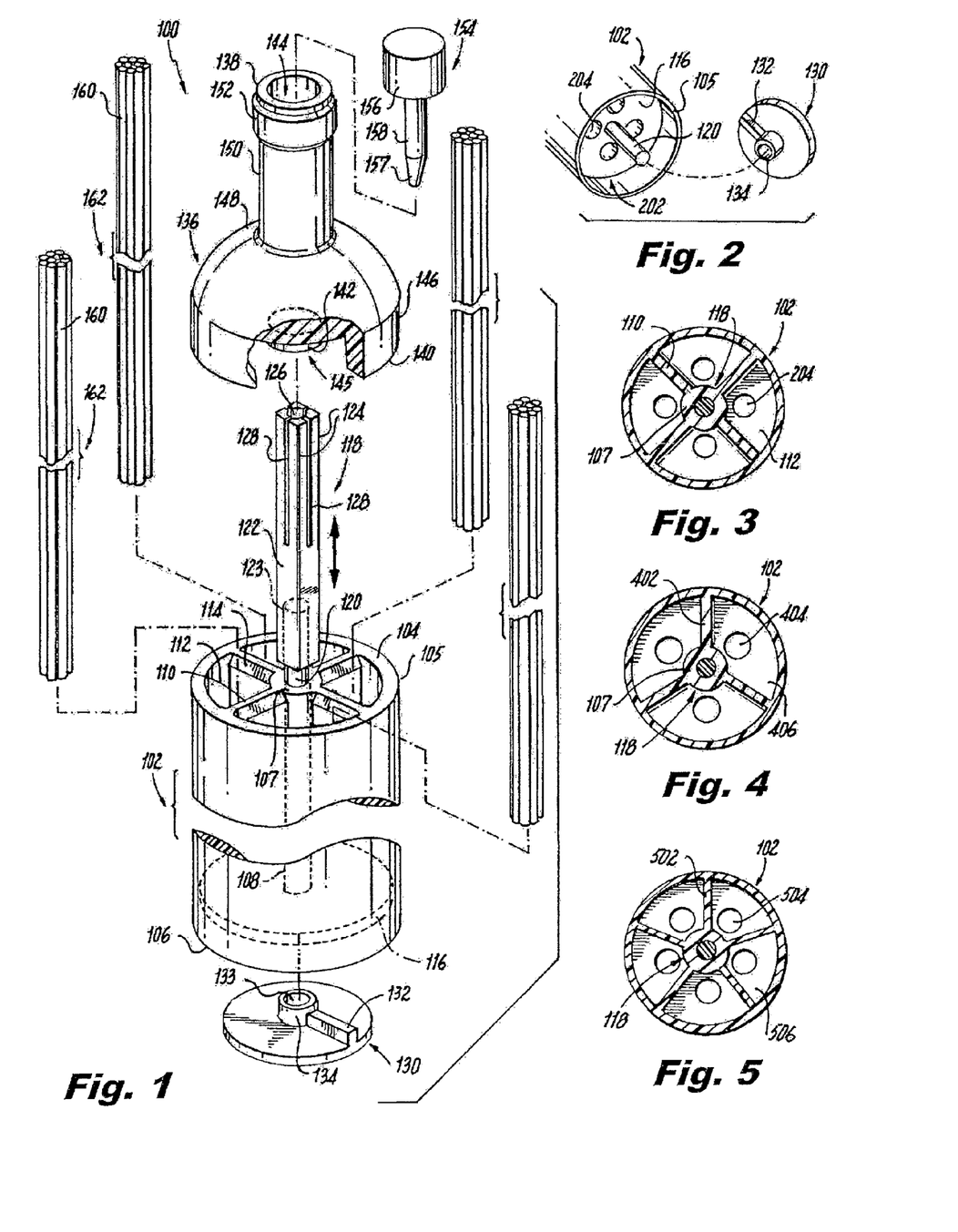
FIG. 1 illustrates a first embodiment of an example configurable device to break dried pasta strands into pieces of approximately similar length.
FIG. 2 illustrates an example recess in the configurable device illustrated in FIG. 1.
FIGS. 3-5 illustrate top views of several embodiments of the body with differing number of receptacles for dried pasta strands.

FIG. 1 illustrates a first embodiment of an example configurable device 100 to break dried pasta strands 160 into pieces of approximately similar length. In some embodiments, the external shape of device 100 approximates a wine bottle. In alternative embodiments, the device 100 can embody any overall shape (e.g., square, rectangular, tubular, etc.) or a combination of shapes. In one embodiment, the device 100 is made of wood. In alternative embodiments, the device 100 can be made of any material (e.g., metal, plastic, etc.) or a combination of materials.

The device 100 includes a body 102, a driveshaft 118, a plate 130, a driver 136, and optionally, a connector 154. The body 102 is of a generally round cross-section, defining a top plane 104, a bottom plane 106, and an outer wall 105. The body can have a shape of a bottom portion of bottle (e.g., wine bottle). In some embodiments, the top plane 104 and the bottom plane 106 are parallel. The body 102 includes an inner hub 107 that includes an axial bore 108, which extends axially through the inner hub 107 of the body 102 to a bottom wall 116, which is described in greater detail below with reference to FIGS. 2 and 6. In some embodiments, the inner hub 107 has a generally round cross-section. In alternative embodiments, the inner 107 can have any overall shape (e.g., square, rectangular, etc.) or a combination of shapes. The axial bore 108 is generally round.

A plurality of walls 110 extends radially from the inner hub 107 to the outer wall 105 defining a plurality of receptacles 112 in the body 102. In some embodiments, the outer wall 105 is generally round and coaxial with the inner hub 107. In other embodiments, the outer wall 105 can have any overall shape (e.g., square, rectangular, etc.) or a combination of shapes. One or more of the walls 110 can include at least one chamfer 114 extending radially from the hub 107 at least partially along a top portion of the one or more of the walls 110. The receptacles 112 extend through the top plane 104 to the bottom wall 116. The receptacles 112 are sized and dimensioned to receive dried pasta strands 160 into the body 102. The chamfer 114 allows for easier loading of the dried pasta strands 160 into the receptacles 112 of the body 102.

The driveshaft 118 includes a bottom portion 120 and a top portion 122. The bottom portion 120 of the driveshaft 118 has a generally round cross-section. The bottom portion 120 is disposed in the axial bore 108 in a rotational engagement. A first end of the bottom portion 120 engages the top portion 122 via an axial opening 123. A second end of the bottom portion 120 engages the plate 130 via an axial opening 133 of a connector 134. The first and second ends of the bottom portion 120 are respectively secured in the first and second axial openings 123, 133, such as by pressure fitting, gluing, another securing mechanism, or a combination of securing mechanisms. As shown by the double-sided arrow in FIG. 1, the driveshaft 118 is enabled to move axially up and down (i.e., vertically) with respect to the axial bore 108 of the hub 107. The top portion 122 of the driveshaft 118 and the connector 134 of the plate 130 act as stops to limit the axial movement of the driveshaft 118 with respect to the axial bore 108.

The top portion 122 of the driveshaft 118 has a generally square cross-section. A first end of the top portion 122 includes an axial opening 126 and slots 128. The slots 128 extend radially from the axial opening 126 through the exterior surface of the top portion 122 to define flexible corner reeds 124.

The plate 130 is generally round and planar. In some embodiments, top and bottom faces of the plate 130 are generally parallel. The plate 130 includes a connector 134 and a projection 132 disposed on the top face of the plate 130. The connector 134 includes an axial opening 133 to secure the bottom portion 120 of the driveshaft 118, such as by pressure fitting, gluing, another securing mechanism, or a combination of securing mechanisms. In some embodiments, the connector 134 has a generally round cross-section. In other embodiments, the cross section can have a different cross-section (e.g., square, rectangular, etc.) or combination of shapes. The projection 132 extends upwardly from the top face of the plate 130 and further extends radially from the connector 134 at least partially toward a periphery of the plate 130.

The driver 136 defines a top plane 138 and a bottom plane 140. In some embodiments, the top plane 138 and the bottom plane 140 are parallel. The driver 136 has a shape of a top portion of a bottle (e.g., wine bottle). In the bottle embodiments, the driver 136 includes an outer wall 146, an arcuate portion 148 and a neck 150. The outer wall 146 generally matches the outer wall 105 of the body 102. The arcuate portion 148 transitions from the outer wall 146 to the neck 150. The neck 150 is generally tubular and can have an annular outer lip 152. In alternative embodiments, the driver 136 can have a different shape (e.g., square, rectangular, etc.) or combination of shapes.

The driver 136 has an inner hub 142 that includes an axial opening 144. The inner hub 142 and the outer wall 146 define a recess 145 in the driver 136 that extends from the hub 142 to the outer wall 146 and partially toward the neck 150. The axial opening 144 extends axially through the inner hub 142 of the driver 136 from and through the top plane 138 and to and through the bottom plane 140. In some embodiments, the inner hub 142 has a generally round cross-section. In alternative embodiments, the inner 142 can have any overall shape (e.g., square, rectangular, etc.) or a combination of shapes. The axial opening 144 has an approximately square shape that is similar to the top portion 122 of the driveshaft 118, such that the driver 136 can engage the driveshaft 118 in a rotational engagement.

The connector 154 includes a top 156 and a pin 158. The top 156 has a generally round cross-section, while one or more other shapes or combinations of shapes are possible. In some embodiments, the top 156 can include a top surface and a bottom surface that are generally parallel. The pin 158 extends axially from the bottom surface of the top 156. The pin 158 is to be received through the axial opening 144 in the driver 136 into the axial opening 126 of the driveshaft 118. When received into the driveshaft 118, the connector 154 can resemble a wine bottle cork inserted into a wine bottle. The pin 158 has a tapered tip to facilitate receipt of the pin 158 into the axial opening 126 of the driveshaft 118. Upon receipt into the axial opening 126, the pin 158 expands the corner reeds 124 circumferentially into the axial opening 144 to secure the vertical orientation of the driveshaft 118 in relation to the body 102 and the driver 136.

The dried pasta strands 160 are shown in bundles 162 and have an approximately round cross-section. It should be noted that in various embodiments, the pasta strands 160 can have a variety of cross-sections (e.g., spaghetti, linguini etc.), which can be uniform or mixed in the different bundles 162. The bundles 162 of dried pasta strands 160 are to be received into the respective receptacles 112 of the body 102.

FIG. 2 illustrates an example recess 202 in the configurable device 100 illustrated in FIG. 1. The recess 202 is formed in the body 102, being defined by the outer wall 105 and the bottom wall 116.

The bottom portion 120 of the driveshaft 118 extends through the bottom wall 116 into the recess 202. The plate 130 is shown removed from the driveshaft 118 in order to show the recess 202 with clarity. However, it should be noted that the plate 130 is secured to the bottom portion 120 of the driveshaft 118 via the connector 134 as described hereinabove.

The diameter of the plate 130 is smaller than the inner diameter of the outer wall 105 to partially enclose the recess 202, as will be described in greater detail with reference to FIG. 6. The length of the bottom portion 120 can be adjusted in relation to the recess 202 by moving the driveshaft 118 down until the top portion 122 of the driveshaft 118 stops the downward movement abutting the inner hub 107, or by moving the driveshaft 118 up until the connector 134 of the plate 130 stops the upward movement abutting the bottom wall 116.

The bottom wall 116 also includes a plurality of openings 204 that connect the receptacles 112 with the recess 202. As will be described in greater detail herein, the openings 204 communicate one or more of the dried past strands 160 from the bundles 162 loaded in the receptacles 112 into the recess 202 until the dried past strands 160 thus communicated contact the plate 130.

The openings 204 provide a limit to the number of dried past strands 160 in the receptacles 112 that can be communicated into the recess 202 at one time, such that breaking the dried past strands 160 into pieces of approximately similar length can be accomplished without much effort.

FIGS. 3-5 illustrate top views of several embodiments of the body 102 with differing number of receptacles 112 for dried past strands 160. As will be described with reference to FIGS. 3-5, the number and shape of the receptacles 112 can vary as long as dried pasta strands 160 loaded in the receptacles 112 can be communicated into the recess 202 as described herein.

FIG. 3 illustrates a top view of the embodiment of the body 102 described hereinabove with reference to FIGS. 1 and 2. In this embodiment, four walls 110 extend radially from the hub 107 to define four receptacles 112 having openings 204 to communicate dried pasta strands 160 loaded in the receptacles 112 into the recess 202.

The openings 204 are approximately centrally located side-to-side between the walls 110. Moreover, the openings 204 are located closer to the hub 107 than the outer wall 105 of the body 102, such that the dried pasta strands 160 can contact the plate 130 approximately between the connector 134 and the peripheral edge of the plate 130.

It should be noted that, while the four walls 110 are shown to be spaced equidistantly about the hub 107, the spacing between the walls 110 can vary in different embodiments of the body 102.

FIG. 4 illustrates a top view of an embodiment of the body 102 with three receptacles 406. In this embodiment, three walls 402 extend radially from the hub 107 to define three receptacles 406 having openings 404 to communicate dried pasta strands 160 loaded in the receptacles 406 into the recess 202.

The openings 404 are approximately centrally located side-to-side between the walls 402. Moreover, the openings 404 are located closer to the hub 107 than the outer wall 105 of the body 102, such that the dried pasta strands 160 can contact the plate 130 approximately between the connector 134 and the peripheral edge of the plate 130.

Similarly, while the three walls 402 are shown to be spaced equidistantly about the hub 107, the spacing between the walls 402 can vary in different embodiments of the body 102.

FIG. 5 illustrates a top view of an embodiment of the body 102 with five receptacles 406. In this embodiment, five walls 502 extend radially from the hub 107 to define five receptacles 506 having openings 504 to communicate dried pasta strands 160 loaded in the receptacles 506 into the recess 202.

The openings 504 are approximately centrally located side-to-side between the walls 502. Moreover, the openings 504 are located closer to the hub 107 than the outer wall 105 of the body 102, such that the dried pasta strands 160 can contact the plate 130 approximately between the connector 134 and the peripheral edge of the plate 130.

Similarly, while the five walls 502 are shown to be spaced equidistantly about the hub 107, the spacing between the walls 502 can vary in different embodiments of the body 102.

In the embodiments described hereinabove with reference to FIGS. 3-5, the bottom wall 116 inside the receptacles 112, 406, 506 can be sloped toward and about the openings 204, 404, 504, such that the dried pasta strands 160 loaded in the receptacles 112 can be communicated more easily through openings 204, 404, 504 into the recess 202.

Figure 6:
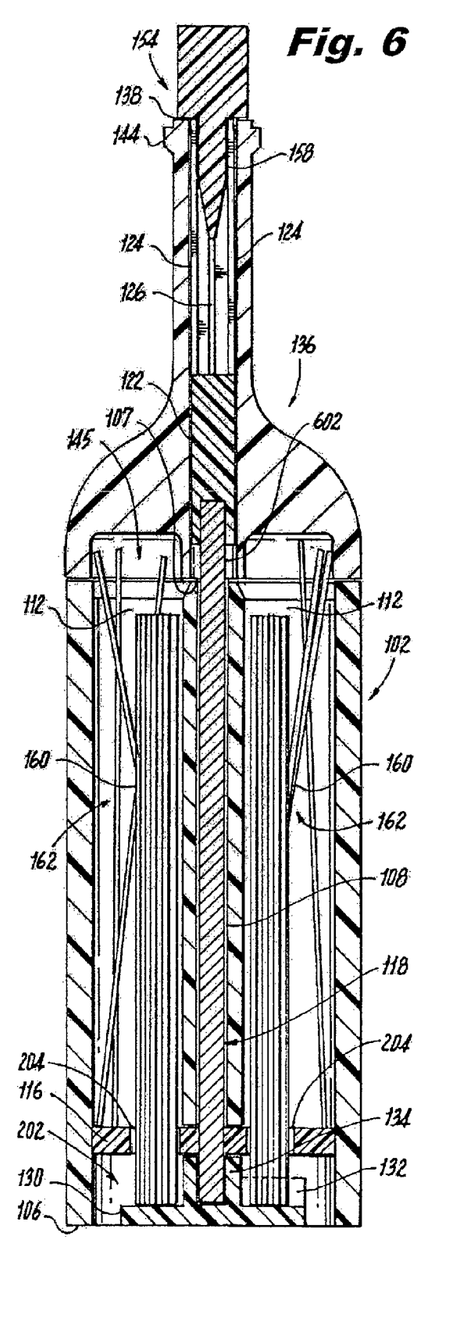
FIG. 6 illustrates a cross-section of the configurable device illustrated in FIG. 1, assembled with bundles of dried pasta strands disposed in respective receptacles.

FIG. 6 illustrates a cross-section of the configurable device 100 illustrated in FIG. 1, assembled with bundles 162 of dried pasta strands 160 disposed in respective receptacles 112.

As particularly illustrated in FIG. 6, the driveshaft 118 extends axially to the top surface 138 of the driver 136 in a selected first axial orientation. In the first axial orientation, the connector 134 abuts the bottom wall 116, limiting further upward axial movement of the driveshaft 118 with respect to the axial bore 108 of the body 102 and the axial opening 144 of the driver 136. Moreover, in the first axial orientation, the top portion 122 of the driveshaft 118 is disposed a distance 602 from the hub 107 of the body 102.

In a selected second axial orientation, the top portion 122 of the driveshaft 118 abuts the hub 107 of the body 102, limiting further downward axial movement of the driveshaft 118 with respect to the axial bore 108 of the body 102 and the axial opening 144 of the driver 136 (not shown). Moreover, in the second axial orientation, the connector 134 of the plate 130 is disposed the same distance 602 from bottom wall 116 of the body 102. In second axial orientation, the plate 130 extends below the bottom plane 106 of the body 102 (not shown).

It should be noted that the driveshaft 118 can also be disposed in a multiplicity of selected upward/downward axial orientations with respect to the axial bore 108 of the body 102 and the axial opening 144 of the driver 136, between the first orientation and the second orientation.

In a selected axial orientation, the top portion 122 of driveshaft 118 engages the opening 144 of the driver 136 (e.g., square top portion 122 engages square opening 144). The connector 154 secures the axial orientation of the driveshaft 118 with respect to the axial bore 108 of the body 102 and the axial opening 144 of the driver 136. Specifically, the pin 158 of the connector 154 is received through the axial opening 144 in the driver 136 into the axial opening 126 of the driveshaft 118, which expands the corner reeds 124 circumferentially into the axial opening 144, securing of the driveshaft 118 in relation to the body 102 and the driver 136 in the selected axial orientation.

To load (or reload) bundles 162 of dried pasta strands 160 into the respective receptacles 112, the connector 154 is withdrawn from axial opening 126 of the driveshaft 118, releasing the engagement of the corner reeds 124 with the axial opening 144 of the driver 136. Thereafter, the driver 136 is removed from the driveshaft 118, exposing the receptacles 112 in the body 102. After loading (or reloading) the bundles 162 of dried pasta strands 160 into the respective receptacles 112, the driver 136 is disposed onto the driveshaft 118 in a selected axial orientation and the connector 154 secures the driveshaft 118 in relation to the body 102 and the driver 136 in the selected axial orientation.

As further illustrated in FIG. 6, one or more pasta strands 160 of the bundles 162 of in the receptacles 112 are drawn by gravity through the openings 204 into the recess 202 until the one or more pasta strands 160 abut or contact the plate 130. The configurable device 102 can be shaken to advance the one or more pasta strands 160 through the openings 204 into the recess 202.

Figure 7:
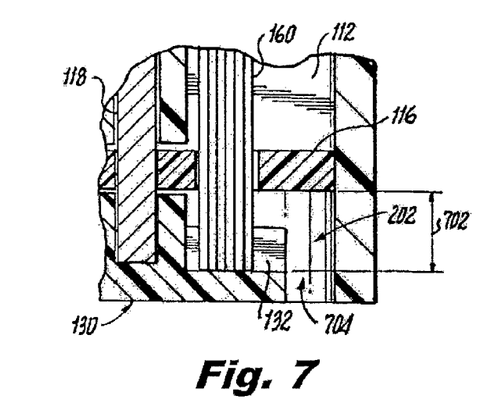
FIGS. 7-9 illustrate exploded cross-sectional views of a recess in several rotational configurations of a driver with respect to a body during operation of the configurable device illustrated in FIG. 6.
Figure 8:
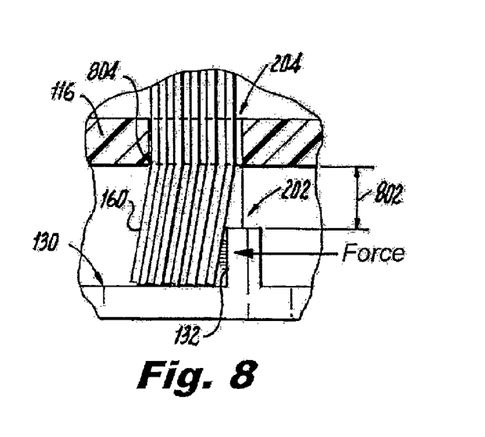
Figure 9:
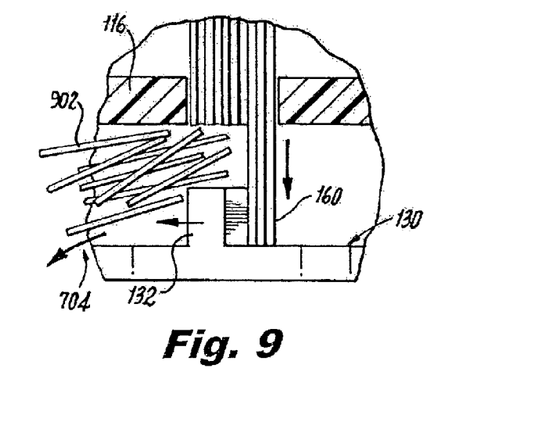

FIGS. 7-9 illustrate exploded cross-sectional views of the recess 202 in several rotational configurations of the driver 136 with respect the body 102 during operation of the configurable device 100 illustrated in FIG. 6.

FIG. 7 illustrates a first rotational configuration in which one or more pasta strands 160 from a bundle 162 loaded in a receptacle 112 are communicated into the recess 202 and contact the plate 130. The projection 132 of the plate 130 is behind the one or more pasta strands 160 in the recess 202.

As illustrated in FIG. 7, the recess 202 has a selected height 702, which was described hereinabove with respect to selecting axial orientations of the driveshaft 118 with respect to the body 102 and the driver 136.

As further illustrated in FIG. 7, the diameter of the plate 130 is smaller than the inner diameter of the body 102, partially enclosing the recess 202 and leaving an annular opening 704 to the outside of the configurable device 100.

FIG. 8 illustrates a second rotational configuration in which the projection 132 of the plate 130 is advanced rotationally to exert a force on the one or more pasta strands 160 in the recess 202 against the bottom wall 116.

As further illustrated in FIG. 8, the projection 132 is disposed at a distance 802 from the bottom wall 116, which enables the one or more pasta strands 160 to fracture against the bottom wall 116 at an edge 804 of the opening 204 in the bottom wall 116. This mitigates flexural waves that can cause the pasta strands to break into fragments of various lengths, as described hereinabove in the section concerning brief discussion of related art.

FIG. 9 illustrates a third rotational configuration in which the projection 132 of the plate 130 is advanced rotationally breaking the one or more pasta strands 160 in the recess 202 against the edge 804 of the opening 204 in bottom wall 116.

As the one or more pasta strands 160 are broken in the recess 202 into pieces 902, gravity advances the remainder of the one or more pasta strands 160 from the receptacle 112 into the recess 202. The pieces 902 are advanced by gravity through the annular opening 704 to the outside of the configurable device 100.

It should be noted that the pieces 902 have approximately similar length based on the selected height 702 illustrated in FIG. 7. The height 702 of the recess 202 can be selected to be different in order to break the strands of dried pasta 160 into pieces of a different length.

The description of the three rotational configurations described hereinabove with reference to FIGS. 7-9 provides a thorough understanding of breaking the one or more pasta strands 160 in relation to one receptacle 112 in the body 102. Accordingly, one full rotation of the driver 136 with respect to body 102 (e.g., 360 degrees) will break the one or more pasta strands 160 in the recess 202 from each of the receptacle 112 (e.g., receptacles 112, 406, 506) as described with reference to FIG. 7-9.

Figure 10:
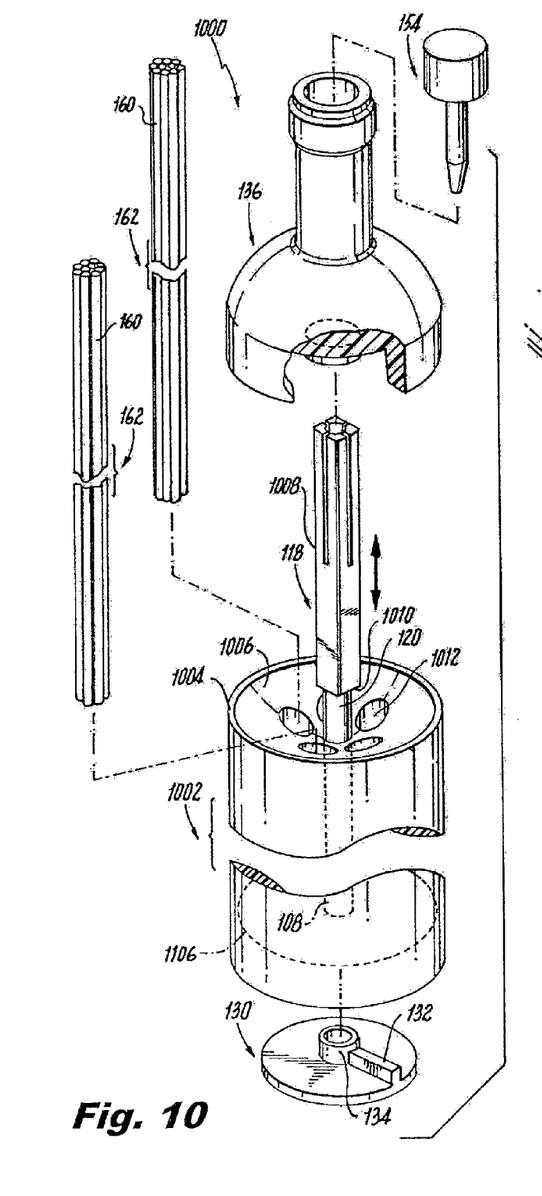
FIG. 10 illustrates a second embodiment of an example configurable device to break dried pasta strands into pieces of approximately similar length.

FIG. 10 illustrates a second embodiment of an example configurable device 1000 to break dried pasta strands 160 into pieces of approximately similar length. In some embodiments, the external shape of configurable device 1000 approximates a wine bottle. In alternative embodiments, the configurable device 1000 can embody any overall shape (e.g., square, rectangular, tubular, etc.) or a combination of shapes. In some embodiments, the configurable device 100 is made of wood. In alternative embodiments, the configurable device 100 can be made of any material (e.g., metal, plastic, etc.) or a combination of materials.

The configurable device 1000 of the second embodiment is similar in construction and operation to the configurable device 100 of the first embodiment. Elements of the configurable devices 100, 1000 that have the same construction are labeled with the same reference numbers, while elements that are different are labeled with different reference numbers and will be described hereinbelow in greater detail.

The configurable device 1000 includes a body 1002, a driveshaft 118, a plate 130, a driver 136, and optionally, a connector 154. The body 1002 has a generally round cross-section and defines an outer wall 1004. The body 1002 includes a concave surface 1006, the axial opening 108 and a plurality of receptacles 1012. The concave surface 1006 extends from the outer wall 1004 to the axial opening 108.

The plurality of receptacles 1012 is located equidistantly about the axial opening 108 such that the bundles 162 of dried pasta strands 160 that are loaded into the receptacles 1012 can contact the plate 130 approximately between the connector 134 and the peripheral edge of the plate 130. It should be noted that, while only five receptacles 1012 are illustrated in FIG. 10, the configurable device 1000 can include any number of receptacles 1012, which can be spaced equidistantly or not about the axial opening 108.

The top portion 1008 of the driveshaft 118 is similar to the top portion 122 except that the bottom 1010 is convex in order to interface with the concave surface 1006 for smooth rotational operation when the top portion 1008 abuts the concave surface 1006.

Figure 11:
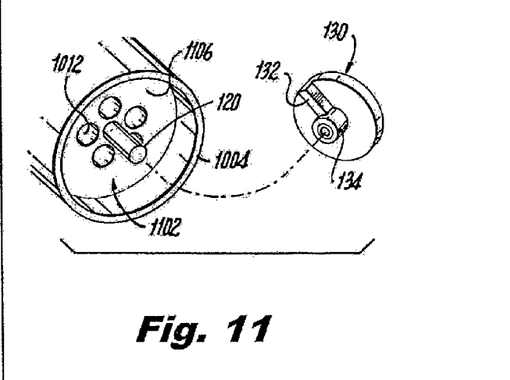
FIG. 11 illustrates an example recess in the configurable device illustrated in FIG. 10.

FIG. 11 illustrates an example recess 1102 in the configurable device 1000 illustrated in FIG. 10. The recess 1102 is formed in the body 1002, being defined by the outer wall 1004 and an inner surface 1106. The dimension of the recess 1102 is similar to the dimension of the recess 202 illustrated in FIG. 2.

The bottom portion 120 of the driveshaft 118 extends through the surface 1106 into the recess 1102. The plate 130 is secured to the bottom portion 120 of the driveshaft 118 via connector 134 as described with reference to FIG. 2. The diameter of the plate 130 is smaller than the inner diameter of the outer wall 1004 to partially enclose the recess 1102. The length of the bottom portion 120 can be adjusted in relation to the recess 1102 by moving the driveshaft 118 down until the top portion 122 of the driveshaft 118 stops the downward movement abutting the concave surface 1006, or by moving the driveshaft 118 up until the connector 134 of the plate 130 stops the upward movement abutting the inner surface 1106.

As illustrated in FIG. 11, the openings 1012 extend from and through the concave surface 1006 into to the recess 1102 to communicate the bundles 162 of the dried pasta strands 160 into the recess 202, such that the dried past strands 160 can be broken into pieces of approximately similar length.

Figure 12:
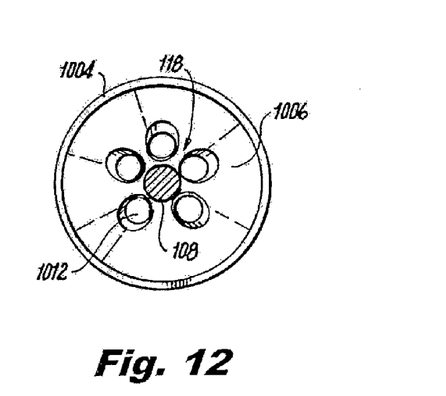
FIG. 12 illustrates a top view of the embodiment of a body described with reference to FIG. 10.

FIG. 12 illustrates a top view of the embodiment of the body 102 described hereinabove with reference to FIG. 10. In this embodiment, five receptacles 1012 are disposed about the axial opening 108 to communicate dried pasta strands 160 loaded in the receptacles 1012 into the recess 202. The receptacles 1012 are located closer to the axial opening than the outer wall 1004 of the body 102, such that the dried pasta strands 160 can contact the plate 130 approximately between the connector 134 and the peripheral edge of the plate 130.

The receptacles 1012 are generally disposed in a ring that is spaced away from the axial opening 108 and generally coaxial with the axial opening 108. It should be noted that additional receptacles can be provided between the receptacles 1012 in a second ring spaced away farther outwardly from the axial opening 108 than the first ring and generally coaxial with the axial opening 108. These additional receptacles are also located such that the dried pasta strands 160 can contact the plate 130 approximately between the connector 134 and the peripheral edge of the plate 130.

Figures 13, 14:
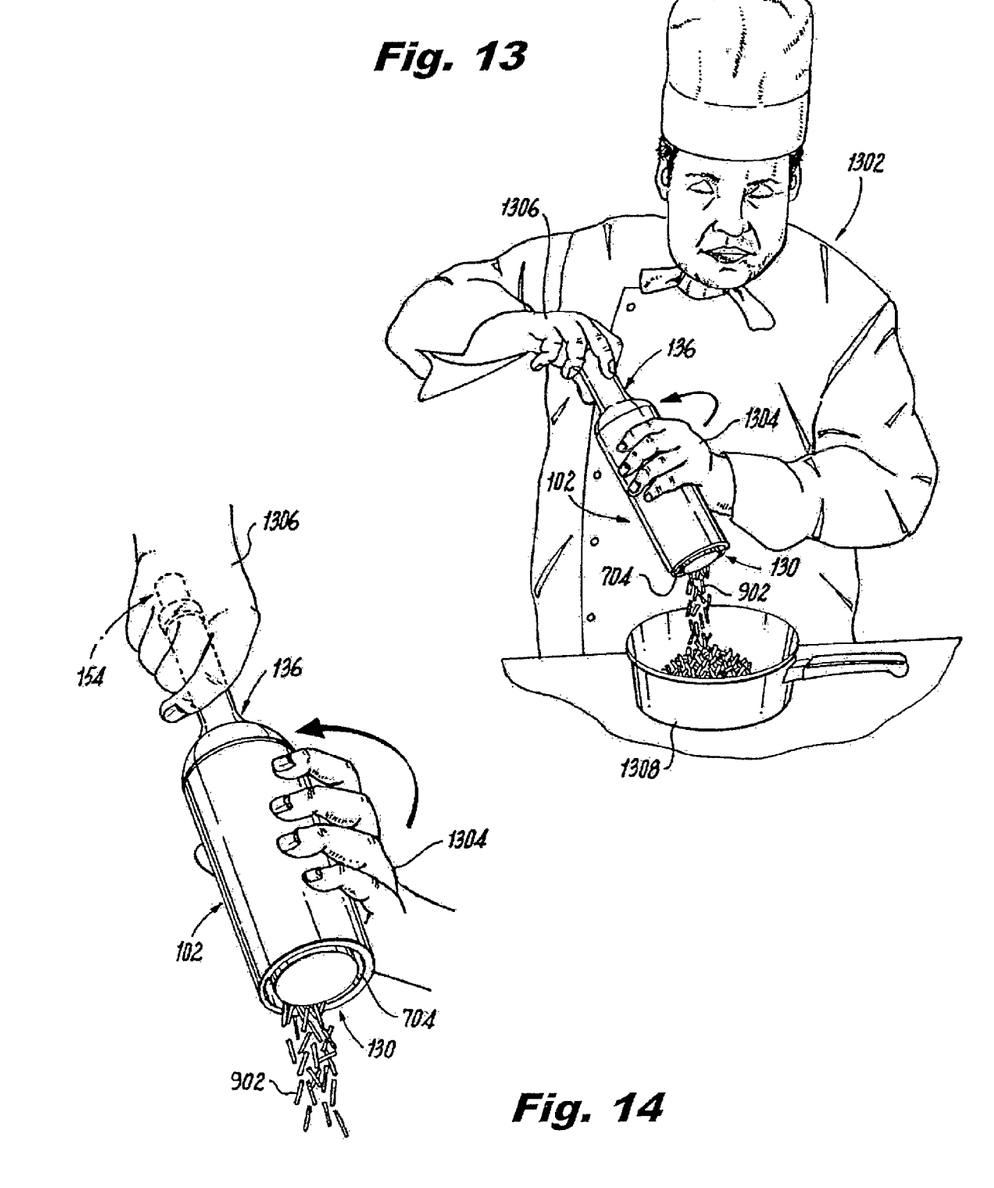
FIGS. 13 and 14 illustrate the operation of the configurable devices illustrated in FIGS. 1 and 10.

FIGS. 13 and 14 illustrate the operation of the configurable devices 100, 1000 illustrated in FIGS. 1 and 10. The operation of the configurable device 100 illustrated in FIG. 1 is described below in greater detail. It is noted that the configurable device 1000 illustrated in FIG. 10 can be operated in the same fashion as the configurable device 100 of FIG. 1. Accordingly, the description below is intended to cover the operation of both embodiments of the configurable device 100, 1000.

To load bundles 162 of dried pasta strands 160 into the configurable device 100, a person 1302 (e.g., cook, chef or any user) withdraws the connector 154 to release the engagement of the driveshaft 118 with respect to the driver 136. Thereafter, the person removes the driver 136 from the driveshaft 118 to expose the receptacles 112 (or receptacles 1012). After loading the bundles 162 of dried pasta strands 160 into the respective receptacles 112 (or receptacles 1012), the person disposes the driver 136 onto the driveshaft 118 in a selected axial orientation (e.g., depending on a desired length for the broken pieces of the dried pasta strands 160). The person then uses the connector 154 to secure the driveshaft 118 in relation to the body 102 and the driver 136 in the selected axial orientation.

In order to cut the shortest pieces of dried pasta strands 160, the driveshaft 118 is disposed in the first axial orientation in which the connector 134 abuts the bottom wall 116 (or the surface 1106). In order to cut the longest pieces of dried pasta strands 160, the driveshaft 118 is disposed in second axial orientation in which the top portion 122 (top portion 1008) of the driveshaft 118 abuts the hub 107 of the body 102 (or the surface 1006 of the body 1002). The connector 154 thus secures the driveshaft 118 in relation to the body 102 (body 1002) and the driver 136 the first or second axial orientation. Various axial orientations can be selected between the first axial orientation and the second axial orientation.

After loading is completed, the dried pasta strands 160 are in contact with the plate 130 in the recess 202 (or recess 1102). The person 1302 holds the body 102 and the driver 136 in his/her respective hands 1304, 1306. Using the hands 1304, 1306, the person 1302 rotates the driver 136 in relation to the body 102, or the body 102 in relation to the driver 136, or a combination of the two. The aforementioned rotation causes the plate 130 to rotate and the projection 132 (FIG. 1) to apply a breaking force to the dried pasta strands 160 in the recess 202 (or recess 1102) of configurable device 100. Accordingly, the dried pasta strands 160 break into pieces 902 of approximately similar length.

The pieces 902 of the dried pasta strands 160 are advanced by gravity through the annular opening 704 to the outside of the configurable device 100 (or configurable device 1000) into a cooking utensil 1308, for example. As the dried pasta strands 160 are broken to form the pieces 902 in the recess 202 (or recess 1102), the portions of the dried pasta strands 160 remaining in the receptacles 112 (or receptacles 1012) are also advanced by gravity into the recess 202 (or recess 1102).

The rotation can be continued until all of the dried pasta strands 160 in the recess 202 (or recess 1102) have been advanced and broken. It should be noted as the dried pasta strands 160 are broken down toward completion, the last pieces may or may not have similar length to earlier pieces 902.

Thus, a configurable device to break strands of dried pasta into pieces of approximately similar length, and a method of breaking strands of dried pasta into pieces of approximately similar length, have been described. Although specific example embodiments have been described, it will be evident that various modifications and changes may be made to these embodiments without departing from the broader spirit and scope of the invention.

Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments shown are described in sufficient detail to enable those skilled in the art to practice the teachings disclosed herein. Other embodiments may be utilized and derived therefrom, such that structural and logical substitutions and changes may be made without departing from the scope of this application.

The foregoing detailed description, therefore, is not to be taken in a limiting sense, and the scope of various embodiments is defined only by the appended claims, along with the full range of equivalents to which such claims are entitled.

Although specific embodiments have been shown and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein will be apparent to those of skill in the art upon reviewing the above description.

The Abstract is provided to comply with 37 C.F.R. §1.72(b) and will allow the reader to quickly ascertain the nature of the technical disclosure of this application. It is submitted with the understanding that it will not be used to interpret or limit the scope or meaning of the claims.

In the foregoing detailed description, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

Moreover, it is contemplated that the features or components of various embodiments described herein can be combined into different combinations that are not explicitly enumerated in the foregoing detailed description and that such combinations can similarly stand on their own as separate example embodiments that can be claimed.

The invention claimed is:

1. A device to break at least one dried pasta strand, the device comprising:
   a body including at least one receptacle, a recess, and an axial bore, the at least one receptacle disposed about the axial bore, the recess disposed below and in communication with the at least one receptacle, the at least one receptacle configured to receive the at least one dried pasta strand and configured to communicate a portion of the at least one dried pasta strand into the recess;
   a driveshaft including a first portion and a second portion, the first portion extending at least through the axial bore, the second portion extending into the recess;
   a plate secured to the second portion of the driveshaft in relation to the recess, the plate including a planar surface having at least one radial projection extending toward the recess, the planar surface configured to abut the portion of the at least one dried pasta strand in the recess; and
   a driver having an axial opening to removeably engage the first portion of the driveshaft, the driver enabled to rotate the driveshaft that in turn rotates the plate causing the at least one radial projection to break the portion of the at least one dried pasta strand in the recess;
   wherein the body defines an outer wall, a plurality of radial walls, and an axial hub, the axial hub including the axial bore, the plurality of radial walls extending from the axial hub to the outer wall, each pair of the plurality of radial walls defining a receptacle about the axial hub.

2. The device of claim 1, wherein the at least one receptacle includes at least one opening that provides communication of the at least one receptacle with the recess.

3. The device of claim 1, wherein at least one wall of the plurality of radial walls includes a chamfer extending radially along a top portion of the at least one wall.

4. The device of claim 1, wherein the body includes a plurality of receptacles disposed about the axial bore.

5. The device of claim 4, wherein the receptacles are openings disposed about the axial bore.

6. The device of claim 5, wherein axes of the openings are parallel with the axial bore.

7. The device of claim 6, wherein the openings are disposed in at least one ring spaced away from the axial bore.

8. The device of claim 1, further comprising a removable connector extendable into the axial opening of the driver to secure the driver in relation to the first portion of the driveshaft.

9. The device of claim 1, further comprising a removable connector including a top and an axial pin, the axial pin extendable into the axial opening of the driver and an axial opening included in the first portion of the driveshaft, such that the driver is secured in relation to the first portion of the driveshaft.

10. The device of claim 1, wherein the first portion of the driveshaft includes an axial opening and a plurality of slots, the plurality of slots extending radially from the axial opening through to an exterior surface of the first portion of the driveshaft, such that pairs of the plurality of slots define a plurality of reeds about the axial opening.

11. The device of claim 10, further comprising a removable connector including a top and an axial pin, the axial pin extendable into the axial opening of the driver and the axial opening of the first portion of the driveshaft, such that the driver is secured in relation to the plurality of reeds of the first portion of the driveshaft.

12. The device of claim 11, wherein the axial pin of the connector expands the plurality of reeds circumferentially against the axial opening of the driver to secure the driver in relation to the plurality of reeds of the first portion of the driveshaft by friction fit engagement.

13. The device of claim 1, wherein the driver includes an outer wall and an axial hub, the axial hub including the axial opening, the outer wall and the axial hub defining a recess in the driver.

14. The device of claim 1, wherein a height of the recess is adjustable with respect to the planar surface of the plate.

15. The device of claim 1, wherein the body includes an outer wall and a concave surface, the concave surface extending from the axial bore to the outer wall.

16. The device of claim 1, wherein the body and the driver combine to form a shape of a bottle.

17. The device of claim 16, wherein the driver forms a top portion of the bottle.

18. The device of claim 16, wherein the body forms a bottom portion of the bottle.

19. The device of claim 1, wherein the driver has a shape of a top portion of a bottle, the driver including an outer wall, an arcuate portion, and a neck, the arcuate portion connecting the outer wall to the neck.

* * * * *